(12) United States Patent
Renaud-Goud

(10) Patent No.: US 8,335,028 B2
(45) Date of Patent: Dec. 18, 2012

(54) HOLOGRAPHIC PROJECTION DEVICE FOR THE ENLARGEMENT OF A RECONSTRUCTION VOLUME

(75) Inventor: Philippe Renaud-Goud, Troyes (FR)

(73) Assignee: Seereal Technologies S.A., Munsbach (LU)

( * ) Notice: Subject to any disclaimer, the term of this patent is extended or adjusted under 35 U.S.C. 154(b) by 651 days.

(21) Appl. No.: 12/161,587

(22) PCT Filed: Jan. 15, 2007

(86) PCT No.: PCT/IB2007/001478
§ 371 (c)(1),
(2), (4) Date: Dec. 8, 2008

(87) PCT Pub. No.: WO2007/099458
PCT Pub. Date: Sep. 7, 2007

(65) Prior Publication Data
US 2009/0086296 A1 Apr. 2, 2009

(30) Foreign Application Priority Data
Jan. 20, 2006 (DE) .................. 10 2006 004 301

(51) Int. Cl.
*G03H 1/08* (2006.01)
*G03H 1/22* (2006.01)

(52) U.S. Cl. ............................................. 359/32; 359/9

(58) Field of Classification Search ................ 359/9, 11, 359/21, 32, 238, 242, 22, 33; 430/1–2
See application file for complete search history.

(56) References Cited

U.S. PATENT DOCUMENTS

| | | | |
|---|---|---|---|
| 3,746,785 A * | 7/1973 | Goodrich | 348/771 |
| 4,067,638 A * | 1/1978 | Yano et al. | 359/9 |
| 5,652,666 A * | 7/1997 | Florence et al. | 359/22 |
| 6,028,689 A | 2/2000 | Michalicek et al. | |
| 6,259,550 B1 * | 7/2001 | Gottfried-Gottfried et al. | 359/279 |
| 7,227,687 B1 * | 6/2007 | Trisnadi et al. | 359/559 |
| 2002/0034006 A1 * | 3/2002 | Kostrzewski et al. | 359/443 |
| 2002/0071178 A1 * | 6/2002 | Suganuma | 359/462 |
| 2002/0176127 A1 * | 11/2002 | Garner | 359/35 |
| 2005/0285027 A1 * | 12/2005 | Favalora et al. | 250/234 |
| 2005/0286101 A1 * | 12/2005 | Garner et al. | 359/9 |
| 2006/0139711 A1 * | 6/2006 | Leister et al. | 359/9 |

OTHER PUBLICATIONS

International Search Report issued in priority International Application No. PCT/IB2007/001478.
Fukaya et al., "Eye-position tracking type electro-holographic display using liquidcrystal devices," Asia Display, pp. 963-963, 1995 (XP002940561).

* cited by examiner

*Primary Examiner* — Stephone Allen
*Assistant Examiner* — Kimberly N Kakalec
(74) *Attorney, Agent, or Firm* — Saul Ewing LLP

(57) ABSTRACT

This invention relates to a holographic projection device with an array of mirror elements in the form of micro-mirrors. The holographic projection device comprises at least one light modulator device, which contains the array of mirror elements, for an enlargement of a reconstruction space for a reconstructed scene. Each mirror element is coupled with at least one actuator. The actuators tilt the corresponding mirror elements and/or displace them axially in at least one direction. Thereby, a wave front for the representation of a reconstructed scene is directly modulated. The holographic projection device comprises an optical system for the projection of the modulated wave front into at least one observer window in an observer plane.

28 Claims, 7 Drawing Sheets

HOLOGRAPHIC PROJECTION DEVICE FOR THE ENLARGEMENT OF A RECONSTRUCTION VOLUME

CROSS REFERENCE TO RELATED APPLICATIONS

This application claims the priority of PCT/IB2007/001478, filed on Jan. 15, 2007, which claims priority to DE 10 2006 004301.4, filed Jan. 20, 2006, the entire contents of which are hereby incorporated in total by reference.

BACKGROUND OF THE INVENTION

This invention relates to a holographic projection device with an array of mirror elements. This invention further relates to a method for the enlargement of a reconstruction volume for viewing a reconstructed, preferably three-dimensional scene, where an illumination device with at least one light source emits sufficiently coherent light.

Holography allows three-dimensional recording and optical representation of objects using wave-optical methods. The reconstruction of the holographic image, often referred to as reconstruction, is realised, depending on the type of hologram, by illuminating a hologram-bearing medium with coherent light. In prior art holographic projection devices the reconstruction volume, or viewing angle, is too small for viewing in particular a three-dimensional scene.

Usually, the reconstruction is viewed directly, i.e. an observer looks on to a computer-generated hologram (CGH), which consists of regularly arranged pixels which are to be encoded in accordance with hologram values. Due to effects of deflection, the reconstruction of the CGH is only achievable within one periodicity interval, which is defined by the resolution of the CGH. The reconstruction is typically repeated showing irregularities in adjacent periodicity intervals. The size of the region to be represented is thus limited by the resolution. The resolution of the hologram would have to be increased substantially in order to enlarge the viewing angle at least to an extent that the scene can be watched with both eyes.

The aim of an extended reconstruction volume and large viewing angle for the holographic reconstruction of an object thus requires a hologram-bearing medium which has a large number of minute pixels. The pixels should be as small as possible and their optical properties should be discretely controllable. Such small distances between the pixels (pitches), which describe the resolution, require costly manufacturing processes for the arrays.

Recording media for CGHs include light modulators, such as LCD, LCoS, acousto-optic modulators, OASLM and EASLM, which modulate the phase and amplitude of incident light.

WO 2005/059659 A2 describes for example a device with a light modulator for the enlargement of the viewing angle in holographic displays. A phase mask with a resolution greater than that of a light modulator used for representing the hologram is disposed immediately behind the light modulator, seen in the direction of light propagation. Each pixel of the light modulator is associated with four or more elements of the phase mask. The phase mask thus generates a higher virtual resolution, and thus an enlarged viewing angle.

However, these benefits are at the cost of additional noise, because the phase mask is the same for each object and there is a random distribution of values when increasing the resolution.

Moreover, light modulators are known which comprise micro-mirrors for light modulation. Such light modulators are used to modulate the amplitude and/or phase of incident light.

U.S. Pat. No. 6,028,689 describes a micro-mirror which is suspended on four carrier arms of a holding bracket. The micro-mirror can be moved along two axes by supplying a voltage to the electrodes provided. The micro-mirror is displaced axially in order to reduce or at least to minimise phase errors in the image.

Document CA 2 190 329 C describes a light modulator for the modulation of the amplitude and phase of incident light. The light modulator comprises micro-mirrors, and between a base plate of the light modulator and each micro-mirror there is a flexural element which will tilt or axially displace the micro-mirror relative to the base plate if an electrostatic force is applied. For amplitude modulation, the micro-mirror of the light modulator is tilted by supplying a voltage between the micro-mirror and an electrode on the base plate of the light modulator. If a voltage is simultaneously supplied to two electrodes on the base plate, the electrostatic force causes an axial movement of the micro-mirror, thus effecting phase modulation.

The reconstruction volume and thus the viewing angle can only be enlarged using the light modulator known from CA 2 190 329 C by increasing the number of pixels and thus by improving the resolution. Moreover, the light modulator described in the aforementioned document is applied to relatively large mirrors (>50 µm).

SUMMARY OF THE INVENTION

It is thus an object of this invention to provide a method and device for holographic representation of preferably three-dimensional scenes in a reconstruction volume or viewing angle which is as large as possible, without increasing the number of pixels of the light modulating device compared with conventional devices, and while keeping pixel control as easy as possible.

This object is solved in an inventive manner by providing at least one wave front modulator device for forming the wave front which comprises an array of mirror elements in order to enlarge a reconstruction volume for a reconstructed scene, where the mirror elements have at least one actuator and where the mirror elements can be moved in at least one direction by the at least one actuator such to affect a phase shift, whereby a wave front can be modulated directly for the representation of the reconstructed scene, and where an optical system is provided for the imaging of the wave front into at least one observer window in an observer plane.

The inventive device comprises at least one wave front modulator device which contains mirror elements for the modulation of an incident wave front. A scene can be reconstructed with the help of thus modulated wave fronts. A multitude of those mirror elements are disposed on the wave front modulator device and are tilted and/or axially displaced to only modulate the phase of the light. The mirror elements can either be tilted or axially displaced, or both, in order to modulate the wave front. The mirror elements can thus be positioned precisely so to modulate the wave front as desired. The mirror elements are tilted and axially displaced for phase modulation of the incident wave front. However, this means that if the phase of light is modulated not all mirror elements must be tilted and axially displaced. Depending on the desired wave front, it is also possible to only tilt several mirror elements or to only displace them axially, while other mirror elements perform both movements, tilting and axial displacement. All mirror elements are controlled when representing a reconstructed scene. If the phase of the incident wave front is modulated and the scene is reconstructed in a defined region, the so-called reconstruction volume, the mirror elements are tilted and axially displaced simultaneously or one after another quickly. If a scene changes or another scene is reconstructed, the control value of several or all mirror elements of the wave front modulator device will change, so that the mirror elements take another tilted position and another axially displaced position. The mirror elements can be positioned by at least one actuator per mirror element, but preferably by two actuators per mirror element, such that a plane wave front which hits the mirror elements is directly modulated according to a given function which represents a three-dimensional object. The thus modulated wave front is imaged on to a virtual observer window in an observer plane, where an observer views the reconstructed scene, in particular a three-dimensional scene.

This way a more precise phase reproduction of the required wave front becomes possible compared with other known light modulators (SLM) which are merely based on phase modulation. Here, the advantage of direct modulation of the wave front is that the computing power required to calculate the fast Fourier transform (FFT) is minimised, which results in time saving for real-time representations and that without increasing the number of pixels of the wave front modulator device, which is here the number of mirror elements, and without complicatedly controlling the actuators of the mirror elements a holographic projection device is provided which through more precise reproduction of the phase of the wave front virtually increases the resolution and thus enlarges the reconstruction volume or viewing angle.

Periodic continuations, which would typically occur, are evaded by a combination of tilting and axial displacement of the mirror elements.

Because the actuators are here disposed under the mirror elements, so that the mirror elements can be arranged at minimum distance to each other, a great fill factor can be achieved more easily. The fill factor is the ratio of the light-sensitive area of the mirror surface to the total size of the wave front modulator device. A great fill factor of the mirror elements if they are axially displaced boasts the advantage that, if used in a holographic projection device, periodic continuations are thereby clearly suppressed. However, if the mirror elements are tilted and axially displaced, no periodic continuations will occur, and the contrast will be increased.

Because the above-mentioned prior art phase mask is the same for all objects and the values are randomly distributed when the resolution is increased, noise of various strength occurs when encoding different objects. The present invention does not employ a fix phase mask, but adapts the control of the mirror elements to each object, so that noise can be controlled and reduced.

The mirror elements are preferably MEMS-type micromirrors (micro-electro-mechanical systems), because these mirrors can be positioned electrically with high precision and they move very quickly. Further, they are very small and the integrated control electronics of the actuators is mostly CMOS-compatible (complementary metal oxide semiconductor compatible). Still further, micro-mirrors have a great reflectance $\rho$ of >approx. 90%, which compares with a reflectance of max. 70% of conventionally used liquid-crystal-based modulators. That means that there is almost no light loss.

In an embodiment of the invention, the wave front modulator device may further be a one-dimensional wave front modulator device, wherein for generating a two-dimensional wave front a deflection element is provided, where said deflection element realises an optical deflection perpendicular to the one wave front modulator device. For this, the inventive device can comprise a deflection element, preferably a galvanometer scanner (mirror galvanometer) or a polygonal mirror for quick deflection of a light beam, in order to generate a two-dimensional wave front for the reconstruction of the three-dimensional scene. The two-dimensional wave front thus generated is composed of a sequence of one-dimensional wave fronts. One-dimensional wave fronts of columns or rows (depending on whether the one-dimensional wave front modulator device is arranged vertically or horizontally) are thereby strung together with the help of the deflection element. The wave front modulator device is thereby fast enough to generate the required wave front in the corresponding row or column. Each position of the deflection element therein corresponds with a section layer (slice) of a for example three-dimensional scene.

In a particularly preferred embodiment of the present invention, the deflection element can be disposed between at least one light source and the wave front modulator device. Such disposition of the deflection element in the inventive projection device has the advantage that the wave front which hits the wave front modulator device has not yet been encoded, so that errors in the generation of the two-dimensional wave front can be widely avoided, or minimised.

In order to make an observer window available in a large observation region, a position detection system can be used to detect eye positions of an observer or of multiple observers in the observer plane while they are viewing the reconstructed scene.

The position detection system follows the eye positions of one or multiple observers while they are viewing the reconstructed scene, and encodes the scene in accordance with a change in the observer eye positions. This is in particular advantageous in order to be able to update the position and/or content of the reconstructed scene in accordance with a change in the eye position by accordingly tilting and/or axially displacing the mirror elements of the wave front modulator device. Then, the observer window can be tracked according to the new eye position.

At least one deflection means can preferably be provided for tracking the observer window to the eye position. Such deflection means can be mechanical, electric, magnetic or optical elements, such as acousto-optic elements.

As regards the method aspect of the invention, the object of the invention is solved by a method for enlarging the reconstruction volume for viewing a reconstructed scene, where the coherent light emitted by the light source is imaged on to a screen, where at least one mirror element of at least one wave front modulator device can be moved by at least one actuator so to effect a phase shift in order to modulate the incident light, thus imaging a wave front, which originates from the light source and which is directly modulated according to the reconstructed scene, into a virtual observer window in an observer plane.

According to the novel method, light of an illumination device, which emits sufficiently coherent light, is directed on to at least one wave front modulator device in order to enlarge a reconstruction volume or viewing angle. The light is thereby imaged on to a screen, preferably on to a mirror. Mirror elements of the wave front modulator device modulate the incident light by being tilted and/or axially displaced by at least one, preferably two controllable actuators per mirror element. At least one mirror element is moved such to effect a phase shift, depending on the target wave front. This way the mirror elements render the shape of a plane wave front after being reflected from an object. The modulation is then an approximation of the ideal wave front after reflection from the object. This allows an approximation to the desired wave front, i.e. a more precise reproduction of the phase of the wave front than with known phase-modulating light modulators becomes possible. This wave front is then preferably imaged into a virtual observer window in an observer plane, where an observer views the reconstructed scene in a two- or three-dimensional mode.

The advantage of the method of directly modulating of the wave front is that a transformation of the target wave front into a hologram becomes superfluous, thus reducing the computing power required by prior art solutions. Controlling the mirror elements with the help of two actuators each allows to displace the mirror elements by $>\lambda/2$, preferably by $2\lambda$. Thanks to this greater displacement of the mirror elements, the resolution can be increased virtually and the wave front modulation can become more precise. Consequently, a larger reconstruction volume or viewing angle can be achieved. According to the novel method, it is possible to reconstruct a three-dimensional scene with true depth in a large reconstruction volume or viewing angle for viewing by at least one observer.

According to a preferred embodiment of this invention, the scene can further be reconstructed in the zeroth diffraction order by tilting the mirror elements. This is particularly preferable because the brightness is greatest in the zeroth diffraction order.

Further embodiments of the invention are defined by the other dependent claims. Embodiments of the present invention will be explained in detail below and illustrated in conjunction with the accompanying drawings. The principle of the invention will be explained based on a holographic reconstruction with monochromatic light. However, it appears to those skilled in the art that this invention may as well be applied to colour holographic reconstructions, as indicated in the description of the individual embodiments.

BRIEF DESCRIPTION OF THE DRAWINGS

FIG. 4b shows an enlarged detail of the projection device shown in FIG. 4a.

DETAILED DESCRIPTION OF THE INVENTION

Figure 1:
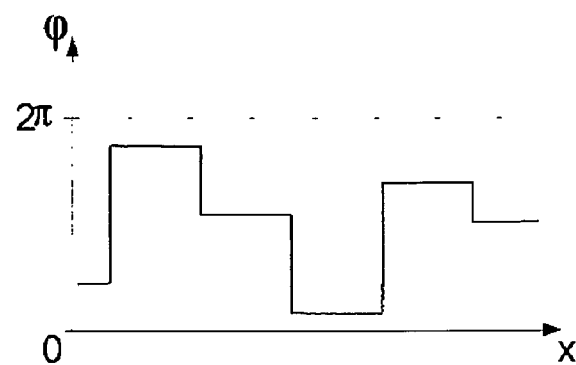
FIG. 1 is a graphic representation of the modulation of a wave front with the help of a prior art light phase modulator by stringing together square functions.

FIG. 1 shows a wave front modulated by a prior art phase-modulating light modulator, where each pixel only represents a certain phase difference between a modulated wave and a reference wave. A wave front modulated with such light modulator can be represented in an idealised form as a string of square functions in a coordinate system. The coordinate of the wave front on the light modulator is plotted on the abscissa, and the phase difference modulo $2\pi$ is plotted on the ordinate. Phase modulation is thus performed in a range of between 0 and $2\pi$. Using such light modulator only allows to obtain an approximation according to the wave front scanning method. A greater resolution, or number of pixels, of the light modulator would be necessary to improve the precision of this approximation. The higher the precision of the approximation, the larger can be the reconstruction volume.

Figure 2:
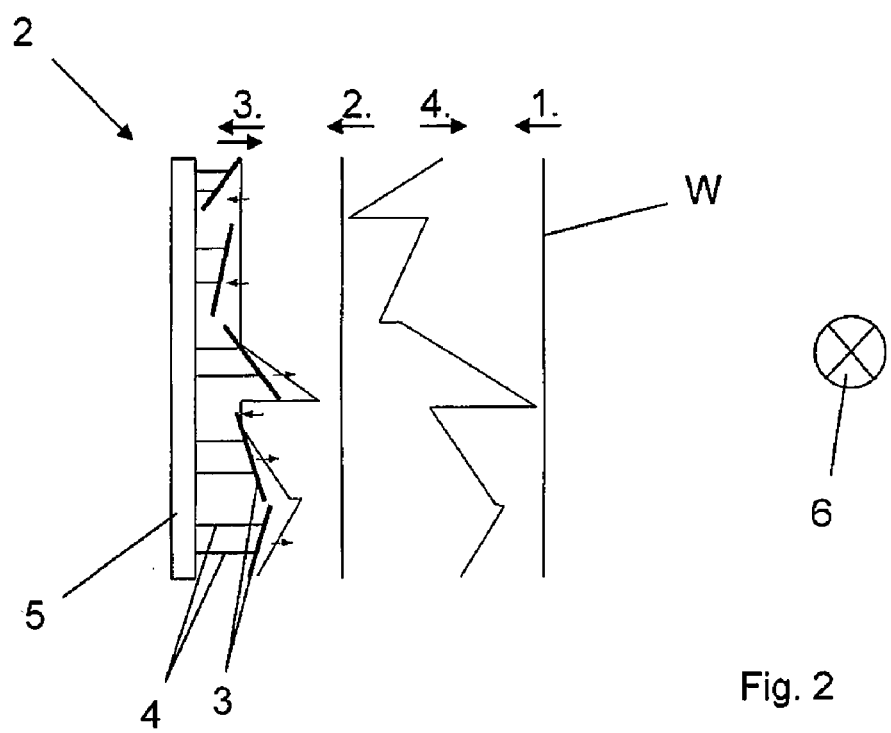
FIG. 2 is a schematic diagram illustrating the wave front modulator device of the inventive holographic projection device used to modulate a wave front.

In order to achieve a more accurate phase reproduction and thereby to enlarge the reconstruction volume or viewing angle, the present invention takes advantage of a holographic projection device 1, which comprises a wave front modulator device 2, as shown in FIG. 2, for modulating the wave front W. For easier understanding of phase modulation, FIG. 2 only shows the wave front modulator device 2, and the entire holographic projection device 1 is only shown in FIG. 4a. This Figure thus only illustrates schematically the modulation of the wave front W, where the wave front modulator device 2 is of the one-dimensional type in this embodiment. The wave front modulator device 2, which is a phase-modulating wave front modulator device 2, comprises mirror elements 3 which have plane reflecting surfaces, for example, and which are preferably micro-mirrors, in particular MEMS (micro-electro-mechanical systems), for example. The mirror elements 3 can of course also have any other reflecting surfaces. These mirror elements 3 represent individual pixels and are coupled with at least one actuator 4, here two actuators 4, each, which are disposed between a substrate 5 of the wave front modulator device 2 and the mirror elements 3. The mirror elements 3 can be tilted around at least one axis and/or be axially displaced by respective control of these actuators 4. The tilting and axial displacement of the mirror elements 3 can be clearly seen in FIG. 2. The mirror elements 3 should be disposed close to each other so to achieve a high fill factor of the reflecting surfaces of the mirror elements 3. The mirror elements 3 have a size of, for example, 49 µm at a pitch of 50 µm, i.e. the gap between two adjacent mirror elements should not exceed 1 µm, so to maintain a high fill factor, here 98 percent. Now, the wave front modulator device 2 comprises a multitude of mirror elements 3, e.g. 1×2000 mirror elements in a one-dimensional wave front modulator device or 2000× 2000 mirror elements in a two-dimensional wave front modulator device, for modulating the phase of the wave front W. In a two-dimensional wave front modulator device, the mirror elements 3 can be tilted around two axes. Further detailed description of the mirror elements 3 and the control thereof is omitted, as it is already known from prior art documents, e.g. document CA 2 190 329 C.

The wave front modulator device 2 is illuminated by a light source 6 of an illumination device (not shown) for phase modulation of the incident wave front W. The wave front W emitted by the light source 6 is a plane wave front, as shown for stages 1 and 2 in FIG. 2. As indicated by the little arrows, in stage 3 this plane wave front W hits the mirror elements 3 of the wave front modulator device 2, where it is modulated and reflected from the according to the tilted and axially displaced mirror elements 3, which are positioned in accordance with a given function that represents a certain object. In stage 4 the modulated wave front W is shown after reflection from the mirror elements 3. The mirror elements 3 thus shape the plane wave front W, which is required to be able to reconstruct a certain three-dimensional scene.

Figure 3:
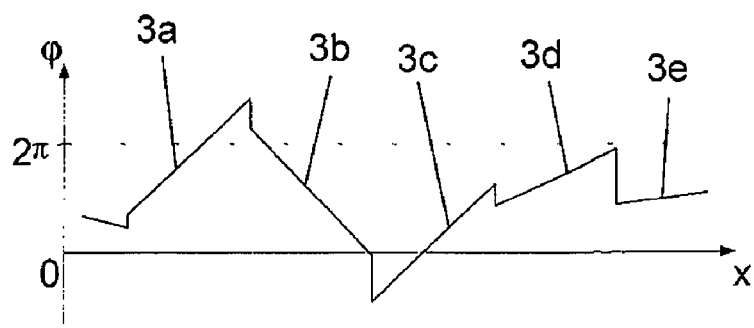
FIG. 3 is a diagram showing the modulation of the wave front by the wave front modulator device shown in FIG. 2.

FIG. 3 shows the phase curve of a wave front after modulation by the tiltable and displaceable mirror elements 3. Sections 3a, 3b, 3c, 3d and 3e of the curve correspond with the required position of the mirror elements 3. It is thereby possible that in the curve of the phase function to be represented the end points of the corresponding mirror element 3 have a phase difference which exceeds $2\pi$, as section 3b in the exemplary curve. Thanks to a combination of tilting and axial displacement of the mirror elements 3, a desired wave front can be approximated at much greater precision than would be possible with wave front modulator devices as shown in FIG. 1. Thereby, the resolution can be increased virtually and thus the reconstruction volume or viewing angle can be enlarged.

The mirror elements 3 are tilted and axially displaced for phase modulation of the incident wave front W that hits the mirror elements 3. If the wave front W hits a MEMS with tiltable and axially displaceable mirror elements 3, it will be changed locally in the propagation direction in accordance with the tilt angle, and delayed locally in accordance with the amount of axial displacement of the mirror element 3. This applies to both the individual mirror element 3 and to a one-dimensional or linear arrangement of adjoined mirror elements. Because all mirror elements 3 exhibit the same reflectance, this is merely a phase modulation of the incident wave front.

Figure 4A:
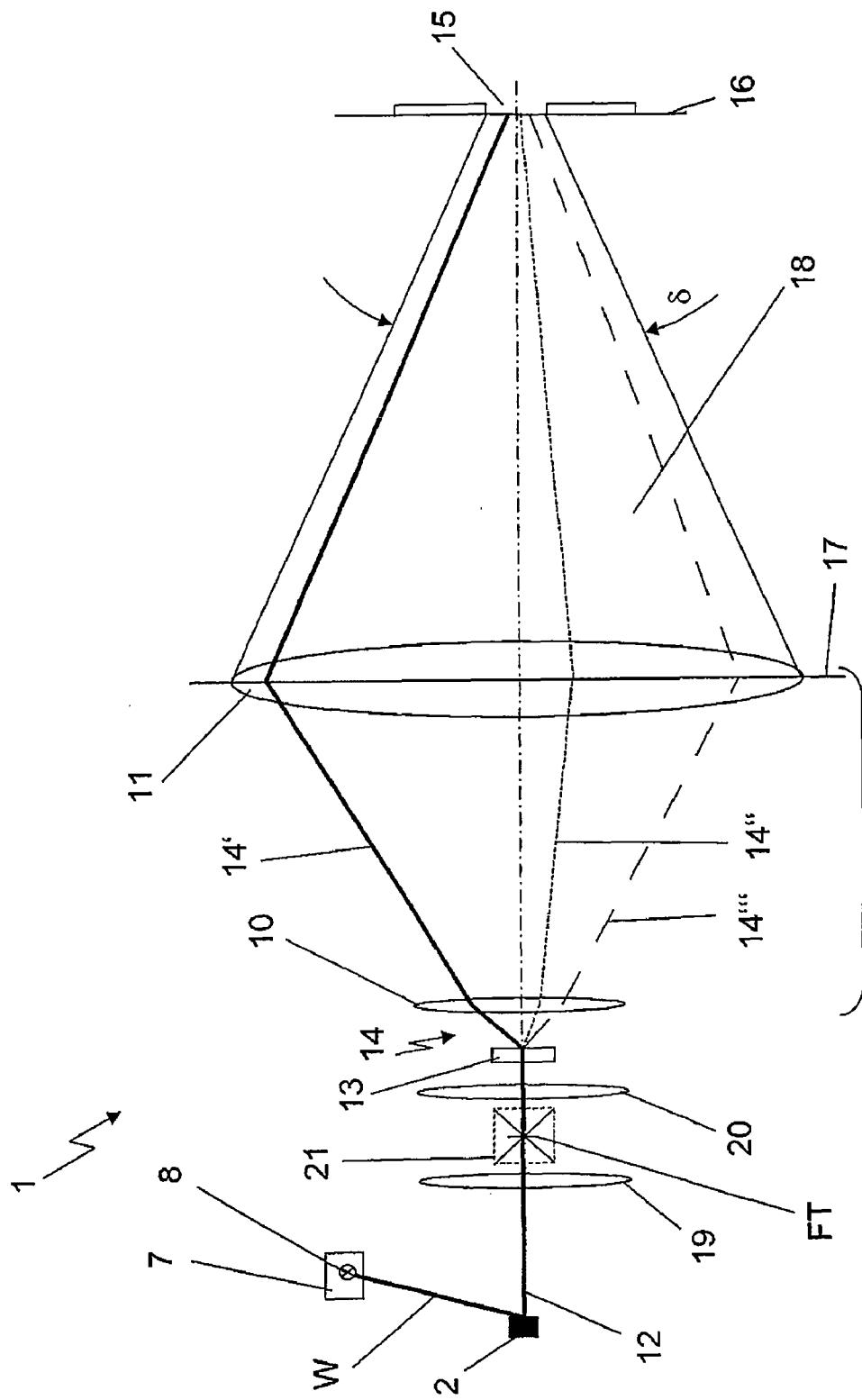
FIG. 4a shows the working principle of the inventive holographic projection device for the reconstruction of three-dimensional scenes (top view).

FIG. 4a is a top view which shows schematically a holographic projection device 1 for the reconstruction of preferably three-dimensional scenes. For easier understanding, the holographic projection device 1 is shown in a simplified manner as a transmissive device in FIG. 4a et seqq. Now, the basic set-up of the holographic projection device 1 will be described. As can be seen in the embodiment, the wave front modulator device 2 is a one-dimensional wave front modulator device, which is disposed vertically here. The wave front modulator device 2 is illuminated by an illumination device 7, more precisely by a line light source 8, which emits sufficiently coherent light. In this document, the term 'sufficiently coherent light' denotes light which is capable of generating interference for the reconstruction of a three-dimensional scene. The light source 8 of the illumination device 7 can be made of laser diodes, DPSS lasers (diode-pumped solid state lasers) or other lasers. Conventional light sources can be used as well as long as they emit sufficiently coherent light. However, such light sources should be filtered so to achieve a sufficient degree of coherence. The holographic projection device 1 further comprises an optical system 9. This optical system 9 comprises a imaging means 10 and a screen 11. Of course, the optical system 5 can also comprise further optical elements, for example as can be seen and as will be described in more detail below. The screen 11 is preferably a mirror, in particular a concave mirror. The screen 11 can also be any other imaging optical element, e.g. a lens, as shown in the Figure. If the screen 11 is a concave mirror, there will be the advantage that the size of the optical system of the holographic projection device 1 is substantially smaller than that of a transmissive device which uses lenses only. The screen 11 should in no case have a diffusing surface, so that a wave front 12 reflected from the wave front modulator device 2 is not destructed. If a two-dimensional representation of the reconstructed scene is desired, the screen 11 can also have a diffusing surface. The imaging means 10 is also a mirror or lens. The monochromatic wave front 12, which is modulated by and reflected from the wave front modulator device 2, is imaged on to a deflection element 13 by lens elements 19 and 20 so to reconstruct a three-dimensional scene. Such deflection element 13 can be a galvanometer scanner, piezo-scanner, resonance scanner, polygon scanner, micro-mirror array or similar device. The deflection element 13 effects an optical deflection of the wave front 12 perpendicular to the wave front modulator device 2, so to generate a two-dimensional wave front 14. The two-dimensional wave front 14 consists of a sequence of parallel one-dimensional wave fronts 14', 14", 14'" ... generated by that deflection. The optical system 9 then images the two-dimensional wave front 14 to a virtual observer window 15 situated in an observer plane 16, where an observer eye views the reconstructed scene. The sufficiently coherent light emitted by the light source 8 is imaged on to the screen 11. Thereby, a Fourier transform FT of the wave front 12 is generated between lens elements 19 and 20, in the image-side focal plane. The imaging means 10 of the optical system 9 then images the Fourier transform FT on to the screen 11 in the image-side focal plane 17. The reconstructed scene can be viewed by the observer in an enlarged reconstruction volume 18, which is formed by a frustum that stretches between the observer window 15 and screen 11, i.e. at an enlarged viewing angle $\delta$. Thanks to the high fill factor of the mirror elements 3 of the wave front modulator device 2, there are no periodic continuations of the reconstructed scene in the observer plane 16.

Because the mirror elements 3 of the wave front modulator device 2 can be tilted by the actuators 4, the modulated wave front 12 can be influenced such that the three-dimensional scene is reconstructed in the zeroth diffraction order. This is particularly preferable, because the brightness or luminous intensity is greatest in the zeroth diffraction order.

Further, it is also possible to integrate the deflection element 13 directly into the wave front modulator device 2. This means that the wave front modulator device 2 modulates the plane wave front W with the help of the mirror elements 3, as described above. However, the wave front modulator device 2, which is used to generate the two-dimensional wave front 14, is displaced as a whole. The lens elements 19 and 20 are not necessary in this case. The wave front modulator device 2 is then disposed next to the deflection element 13, i.e. in the object-side focal plane of the imaging means 10. Consequently, a beam splitter element 21 for colour reconstruction can be disposed between the wave front modulator device 2 and imaging means 10, for example. It is further possible to only displace or tilt the array of mirror elements 3 to generate a two-dimensional wave front instead of displacing or tilting the entire system. This makes it possible to give the holographic projection device 1 a more compact overall design.

However, the holographic projection device 1 may optionally comprise the lens elements 19 and 20 in the optical path. The lens elements 19 and 20 have the same refractive power in order to minimise aberrations, as can be seen here by the individual focal lengths. However, the lens elements 19 and 20 may also have different refractive power or focal lengths in order to modify or optimise the size of the one-dimensional wave front 12 on the deflection element 13, if the latter is disposed between the wave front modulator device 2 and the optical system 9. The lens elements 19 and 20 boast another advantage in this case. They ensure the wave front 12 reflected from the wave front modulator device 2 to be imaged on to the deflection element 13 so to generate a two-dimensional wave front 14. An afocal system, represented here by the lens elements 19 and 20, can be used to image the wave front 12 on to the deflection element 13. Thereby, a Fourier transform FT of the wave front 12 is generated in the image-side focal plane of lens element 19. With the help of lens element 20 and imaging means 10, the Fourier transform FT is imaged on to the screen 11.

The deflection element 13 can alternatively be disposed between the light source 8 and the wave front modulator device 2. This has the advantage that aberrations during modulation of the two-dimensional wave front 14 are eliminated or minimised as far as possible, because the plane wave front W has not yet been encoded when it hits the wave front modulator device 2.

Colour reconstruction of the three-dimensional scene is also possible with the help of the holographic projection device 1. As shown in FIG. 4a, the beam splitter element 21, preferably a prism block, is disposed in front of the imaging means 10, seen in the direction of light propagation. The beam splitter element 21, which is preferably an X prism with dichroic layers, splits red, green and blue light into three separate wave fronts or recombines these separate wave fronts to form a common wave front. Colour reconstruction of the scene is thereby achieved by simultaneously processing the three primary colours, RGB (red, green, blue). In this embodiment, the beam splitter element 21 is disposed between the lens elements 19 and 20, but it can as well be disposed at other positions in the holographic projection device 1. Moreover, any other beam splitter element can be used.

Figure 4B:
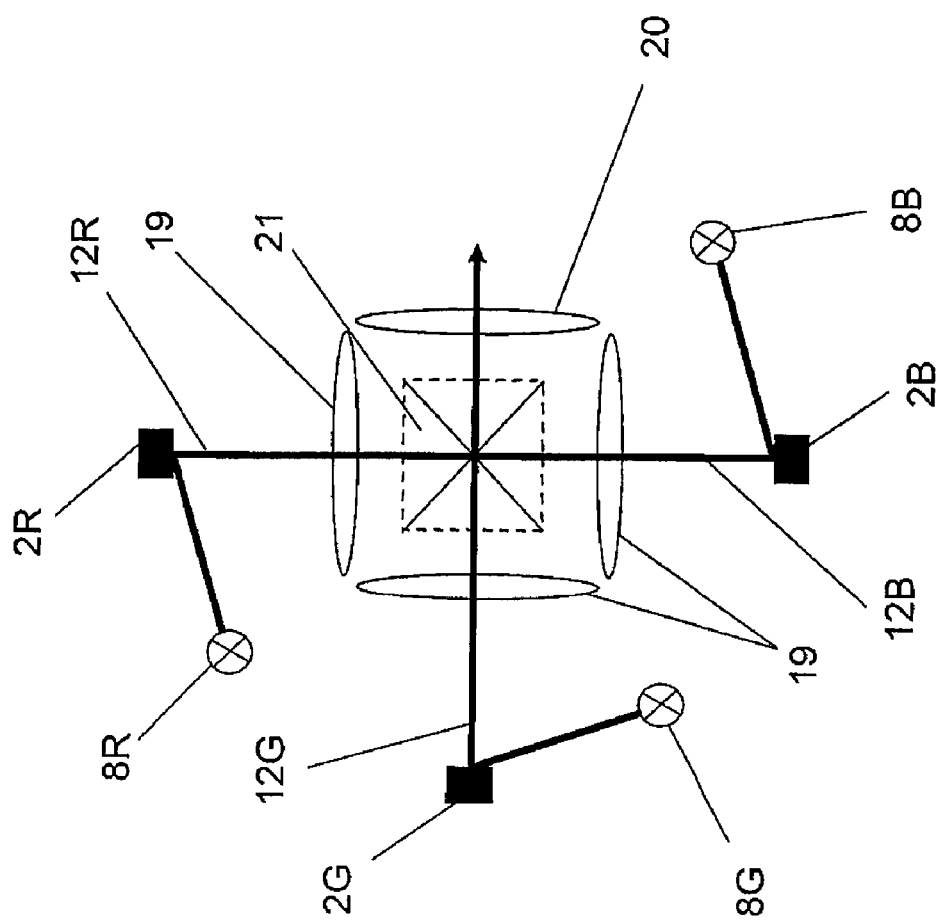

FIG. 4b is an enlarged detail showing the beam splitter element 21 of FIG. 4a. Three wave front modulator devices 2R, 2G and 2B are provided, one each for the three primary colours, RGB, for simultaneous colour reconstruction of the three-dimensional scene. The three wave front modulator devices 2R, 2G and 2B are illuminated by three light sources 8R, 8G and 8B. After modulation of the individual wave fronts 12R, 12G and 12B by the corresponding wave front modulator devices 2R, 2G and 2B, these wave fronts are imaged to the lens element 20 by the beam splitter element 21 in order to recompose a common wave front. It is further possible that only one light source, in particular a white light source, is used for colour reconstruction. In this arrangement, the beam splitter element 21 is also disposed between the lens elements 19 and 20. However, an additional semi-transmissive mirror or other deflection element is disposed between the beam splitter element 21 and the lens element 20. The light emitted by the light source is directed to the semi-transmissive mirror and, from there, it is guided by the beam splitter element 21 on to the three wave front modulator devices 2R, 2G, 2B to illuminate these and to modulate the corresponding wave fronts, where the beam splitter element 21 splits the light up into the three monochromatic wave fronts 12R, 12G and 12 B. Further, it is also possible to use only one instead of three wave front modulator devices for colour reconstruction. However, this option is not shown here. That wave front modulator device can be illuminated by one light source, which consists of three LEDs in different colours or one white light LED. In addition, at least one optical element, e.g. an acousto-optic element, is required, which projects the wave fronts on to the wave front modulator device at different angles of incidence, for example.

Instead of colour reconstruction using three wave front modulator devices 2R, 2G, 2B, as described above, it is also possible to reconstruct the individual colours sequentially with the help of at least one wave front modulator device.

The above described holographic projection device 1 was described for one observer eye only. It is sensible to provide a second wave front modulator device 2 to be able to serve a pair of observer eyes. The optical elements of the existing holographic projection device 1 can be used for this. If the observer is situated in the observer plane 16 and looks through the observer window 15, he can view the reconstructed three-dimensional scene in the reconstruction volume 18, and the scene is reconstructed in front of, on or behind the screen 11, seen in the direction of light propagation. However, it is also possible to provide the pair of observer eyes with a reconstructed scene using only one wave front modulator device 2, which is arranged horizontally.

Figure 5:
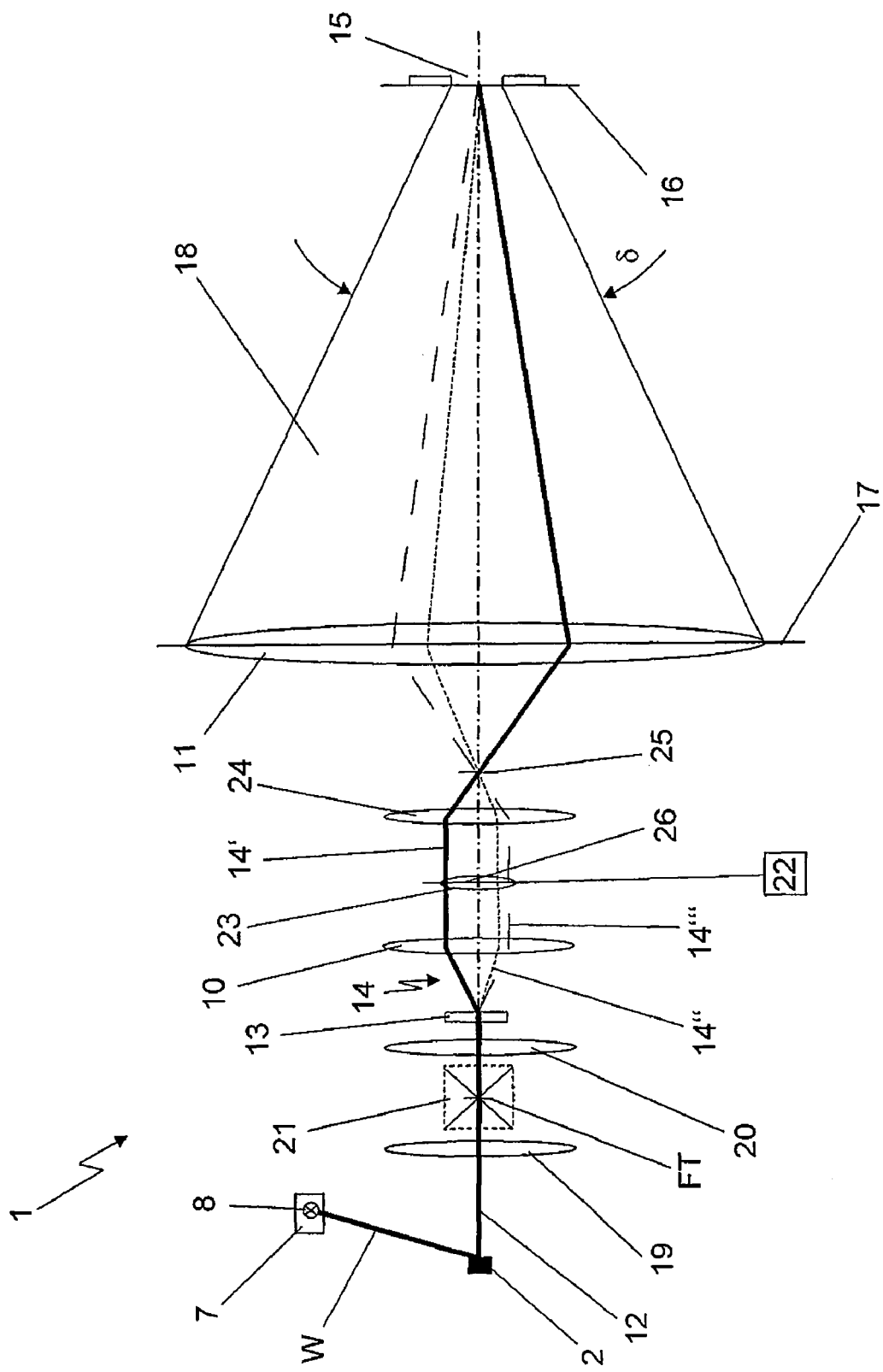
FIG. 5 shows another embodiment of the novel projection device with a position detection system for detecting a change in an eye position (top view).

FIG. 5 shows another embodiment of the holographic projection device 1. Its general design is identical to that of the projection device 1 shown in FIG. 4a. This is why like components are identified by like numerals. The projection device 1 shown here includes in addition a position detection system 22 to detect changes in an eye position of an observer in the observer plane 16. The position detection system 22 can be a camera. A deflection means 23 is disposed between the imaging means 10 and screen 11, preferably in the image-side focal plane of the imaging means 10, for tracking the virtual observer window 15 in accordance with changes in the observer eye position. The deflection means 23 can be discretely controlled and is preferably a mirror. A very precisely working deflection means is required for proper tracking of the observer window 15. This is why the deflection means 23 can be a galvanometer scanner. It is also possible to use other deflection means, such as MEMS arrays, piezo-scanners or similar means. Further, the deflection means 23 can deflect in at least one, i.e. horizontal and/or vertical direction. This means that the one-dimensional version of the deflection means 23 is only able to track the observer window 15 in either horizontal or vertical direction. The two-dimensional version of the deflection means 23 is able to track the observer window 15 in both, horizontal and vertical direction. The deflection means 23 can be an xy-type galvanometer scanner, or two galvanometer scanners can be arranged behind one another, where one is used for horizontal tracking an the other for vertical tracking. Further, a second imaging means 24 is provided behind the deflection means 23, seen in the direction of light propagation. Because of the great magnification required in order to fill the screen 11, the second imaging means 24 can be a system of lenses instead of a single lens, so to avoid or minimise aberrations.

Now, the reconstruction of the three-dimensional scene will be described with the help of this embodiment. The wave front W emitted by the light source 8 hits the mirror elements 3, which modulate it and reflect the modulated wave front 12. After this reflection, the modulated wave front 12 passes through the lens elements 19 and 20, which image it on to the deflection element 13. At the same time, the Fourier transform FT of the wave front 12 is generated by the lens element 19 in the image-side focal plane of lens element 19. After its generation, the two-dimensional modulated wave front 14 passes through the imaging means 10 and incidents on to the deflection means 23. The position detection system 22 can detect any observer movement and track the observer window 15 accordingly by controlling the deflection means 23. The imaging means 10 and 24 generate in an image-side focal plane 25 of the second imaging means 24 an image of the modulated two-dimensional wave front 14. This two-dimensional image in the focal plane 25 is then imaged through the screen 11 into the virtual observer window 15. At the same time, the image of the Fourier transform FT is generated in an image-side focal plane 26 of the imaging means 10. The second imaging means 24 then images the image of the Fourier transform FT on to the screen 11.

It is again sensible to provide a second wave front modulator device 2 to serve a pair of observer eyes. If the observer is situated in the observer plane 16 and looks through the observer window 15, he can view the reconstructed three-dimensional scene in the reconstruction volume 18, and the scene is reconstructed in front of, on or behind the screen 11, seen in the direction of light propagation. However, it is again also possible to provide the pair of observer eyes with a reconstructed scene using only one wave front modulator device 2, which is again arranged horizontally.

The three-dimensional scene can be reconstructed in colour as described above using the beam splitter element 21.

Further, the illumination device 7 with the light source 8 can be disposed at any suitable position in the projection device 1. For example, if the wave front modulator device 2 is of a reflective type, as is the case in this embodiment, the illumination device 7 can also be arranged such that the emitted wave front W is guided on to the wave front modulator device 2 by a deflection element, such as a reflective or semi-transmissive mirror. It is advantageous if the light source 8 is imaged into a Fourier plane, in which the deflection element is situated. At least one optical element, such as a lens, mirror etc., can be provided between the deflection element and the wave front modulator device 2. Referring to FIG. 5, such a deflection element can be disposed where the beam splitter element 21 used to be disposed; the beam splitter element 21 can in such case be disposed between the lens element 19 and the deflection element, or between the deflection element and the lens element 20. This makes it possible to give the projection device 1a more compact design.

Figure 6:
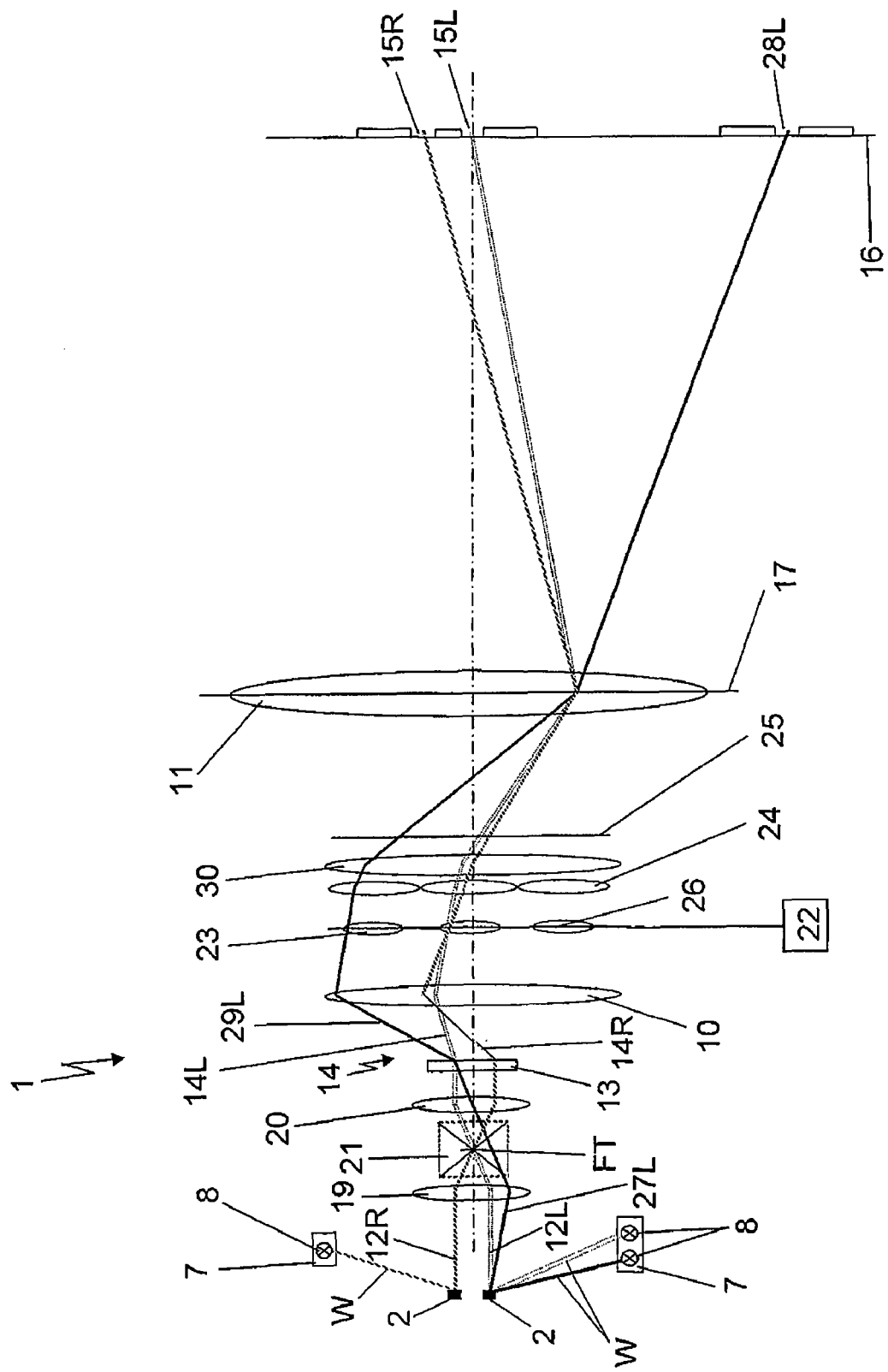
FIG. 6 shows another embodiment of the novel projection device for at least two observers of a reconstructed scene (top view).

FIG. 6 shows another embodiment of the holographic projection device 1. Its general design is identical to that of the projection device 1 shown in FIG. 5. This is why like components are denoted by like numerals. However, in contrast to the devices shown in FIGS. 4a and 5, the holographic projection device 1 here is intended to be used by multiple observers. To keep this diagram comprehensible, the optical paths for only two observers and only a one-dimensional wave front per observer are shown in this embodiment. However, generally more than two observers can view the reconstructed three-dimensional scene. The observer window denoted by the letter R is that for the right eye and the observer windows denoted by the letter L are those for the left eyes of the observers. The holographic projection device 1 shown comprises two wave front modulator devices 2 for presenting the reconstructed three-dimensional scene. Each of these two wave front modulator devices 2 is illuminated by at least one illumination device 7 with at least one light source 8. The light sources 8 are independent of each other and cause different angles of incidence. The number of light sources 8 per wave front modulator device 2 thereby depends on and is determined by the number of observers of the reconstructed scene. In case there are two or more observers, only one wave front modulator device 2 is used for one type of observer window, i.e. for all observer windows for the observers' right eyes or all observer windows for the observers' left eyes. The light sources 8 illuminate with sufficiently coherent light at different angles of incidence the mirror elements 3 of the wave front modulator device 2. The angles of incidence of the light sources 8 for the observer windows 15R and 15L for the eyes of one observer are thereby always almost identical. This means that the angles of incidence of the light emitted by the light sources 8 which generate modulated wave fronts 12L and 27L for the observer windows 15L and 28L are different.

Screen 11, deflection element 13, lens elements 19 and 20 and imaging means 10 and 24 can be used for both wave front modulator devices 2.

In contrast to FIG. 5, two deflection means 23 are provided for tracking at least two, here three, observer windows 15R, 15L and 28L in accordance with the respective observer eye positions. The number of deflection means 23 depends on the number of observers. This means that per observer only one deflection means 23 is used for both eyes, here for observer windows 15R and 15L. The second imaging means 24 is combined with a focusing element 30 and disposed behind the deflection means 23, seen in the direction of light propagation. Here, the second imaging means 24 is a lenticular which aims to collimate the wave fronts 14R and 14L, and the two wave fronts 14R and 14L for the right and left eye run through the lenticule of a second imaging means 24 which is assigned to the first deflection means 23. Once the two wave fronts 14R and 14L have passed the corresponding lenticule of the second imaging means 24, the focusing element 30 aims to overlap and focus the wave fronts 14R and 14L on the screen 11. Another deflection means 23 is provided for tracking the observer window 28L for a two-dimensional wave front 29L. A third shown deflection means 23 is used to serve a third observer. Generally, more than three observers can view a reconstructed three-dimensional scene. The number of lenticules of the second imaging means 24 thereby corresponds with the number of deflection means 23 of the projection device 1. The focusing element 30 can be replaced by a more complex arrangement of lenses in order to minimise aberrations. The focusing element 30 can for example be an achromatic lens. There is also the possibility to provide the second imaging means 24 and the focusing element 30 for example as single lenticular in the projection device 1.

The three-dimensional scene is reconstructed as already described in conjunction with FIG. 5, with the exception that in this embodiment the holographic projection device 1 is designed to serve multiple observers, so that there are multiple deflection means 23 for tracking the observer windows 15R, 15L and 28L. The holographic projection device 1 described above allows to simultaneously serve three observer windows.

Instead of using light sources 8 which emit sufficiently coherent light which hits each wave front modulator device 2 at different angles of incidence, it is also possible to use only one light source 8 per wave front modulator device 2. The wave fronts are in this case multiplied after modulation by and reflection from the mirror elements 3 of the wave front modulator device 2. This can be done for example near the deflection element 13 with the help of a grid element. This solution has the advantage that phase defects of wave fronts which are emitted by the single light sources 8 and which hit the wave front modulator devices 2 can be corrected.

Further, the individual light sources 8 can be generated by at least one optical element from one primary light source (not shown).

As regards FIGS. 5 and 6, the deflection means 23, which has the form of a mirror, and which is preferably a galvanometer scanner, can have a light diffusing layer. The deflection means 23 can thus be a mirror which diffuses light in horizontal direction. The light diffusing layer can have the form of a foil. The diffused light or wave front must propagate at a right angle to the modulated one-dimensional wave front. Because coherence is essential to holographic reconstruction, it must not be influenced by using a light diffusing layer. It is thereby possible, however, to enlarge the observer windows 15, 15R, 15L, 28L in the non-coherent direction, while the observer windows 15, 15R, 15L, 28L are limited in the other direction by the extension of the diffraction orders. It is particularly preferable if the wave front modulator device 2 is arranged horizontally. This way the individual observer windows 15, 15R, 15L, 28L can be enlarged in vertical, i.e. non-coherent direction. This is why it is no longer necessary in this arrangement of the wave front modulator device 2 to track the observer windows 15, 15R, 15L, 28L to the vertical position of the observer, because the observer windows 15, 15R, 15L, 28L have a large extension in that direction. Further, there is the possibility to apply the light diffusing layer on to the screen 11, which would then not only serve for imaging and displaying, but also to diffusing the Fourier transform of the wave front in the non-coherent direction.

Figure 7A:
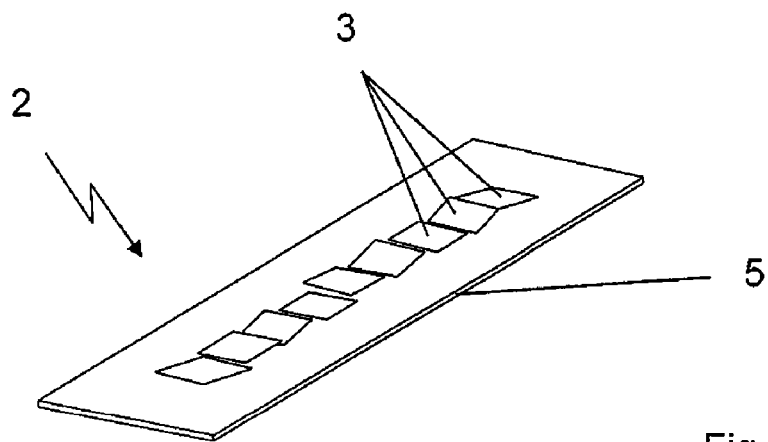
FIG. 7a shows the working principle of a one-dimensional wave front modulator device.

The embodiments of the invention according to FIGS. 4*a*, 5 and 6 always relate to at least one one-dimensional wave front modulator device 2 for modulating at least one incident wave front. Such a one-dimensional wave front modulator device 2 is shown in a perspective view in FIG. 7*a*. As can be seen, the mirror elements 3 are arranged on the substrate 5 in a kind of row or column. The actuators are not shown in this Figure.

Figure 7B:
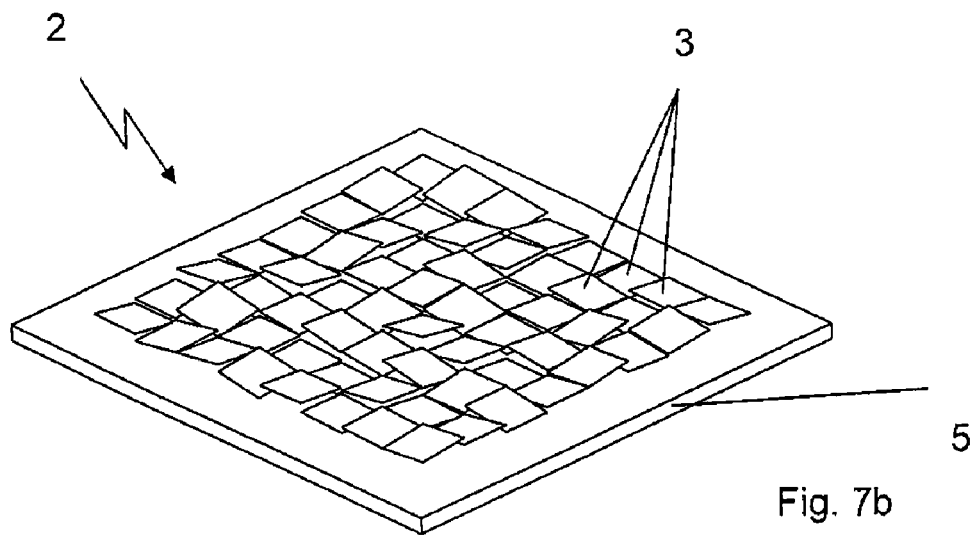
FIG. 7b shows the working principle of a two-dimensional wave front modulator device.

As can be seen in FIG. 7*b*, the invention can also be realised using a two-dimensional wave front modulator device 2. This renders superfluous a deflection element which aims at generating a two-dimensional wave front. The mirror elements 3 are arranged on the substrate 5 in multiple rows or columns. The mirror elements 3 of a two-dimensional wave front modulator device 2 can be axially displaced and/or tilted around one or two axes by at least one actuator each.

Figure 8:
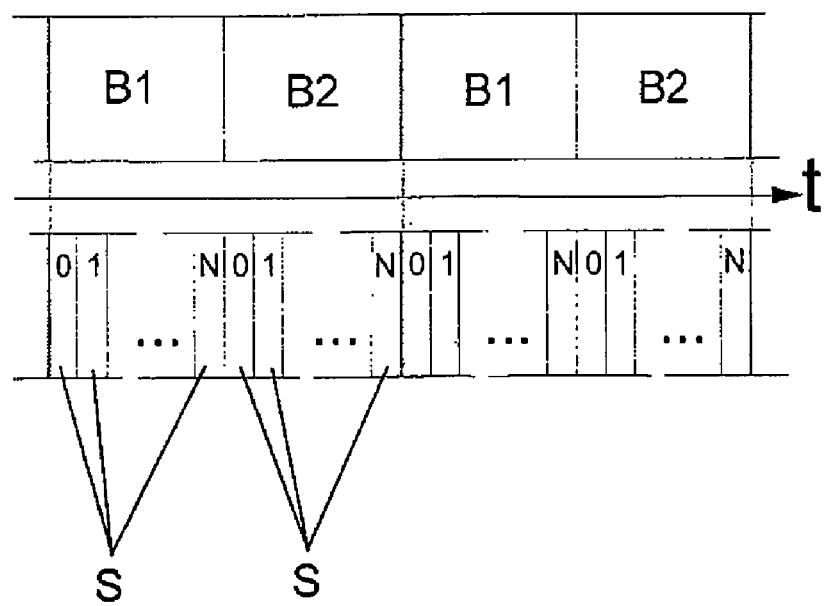
FIG. 8 shows a possibility of reconstructing a scene for one or more observers.
Figure 9:
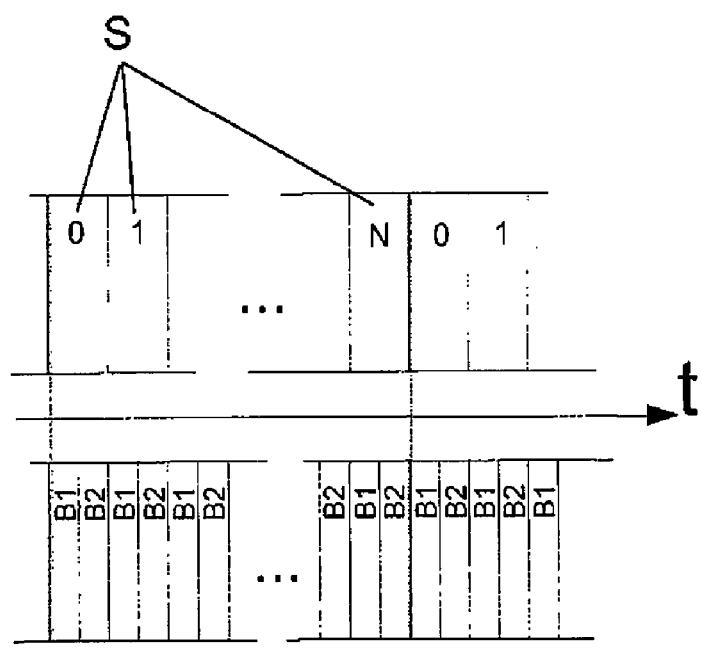
FIG. 9 shows another possibility of reconstructing a scene for one or more observers.

FIGS. 8 and 9 describe several possibilities of temporal multiplexing of rows or columns S of the modulated wave front 12 when realising two-dimensional wave fronts of a partial image of the reconstructed three-dimensional scene for two or more observers B1, B2 with the help of the deflection element 13 in conjunction with the one-dimensional wave front modulator device 2. As shown in FIG. 8, a two-dimensional wave front of a partial image is first fully generated for observer B1, and then for observer B2. As shown in FIG. 9, the rows or columns of the modulated wave front of a partial image associated with the individual observers B1 and B2 are presented alternately.

Possible applications of the holographic projection device 1 include displays for a two- and/or three-dimensional presentation in private or working environments, for example computer displays, TV screens, electronic games, in the automotive industry for displaying information, in the entertainment industry, in medical engineering, here in particular for minimally-invasive surgery applications or spatial representation of tomographically established information, and in military engineering for the representation of surface profiles. It appears to those skilled in the art that the projection device 1 can also be applied in other areas not mentioned above.

The invention claimed is:

1. Holographic projection device having a matrix of mirror elements, which comprises for an enlargement of a reconstruction volume for a reconstructed scene at least one wave front modulator device with an array of mirror elements, where the mirror elements have at least one actuator each, and where the mirror elements can be moved in at least one direction with the help of the at least one actuator such to effect a phase shift, thereby directly modulating a wave front for the representation of the reconstructed scene, and where the holographic projection device further comprises an optical system for imaging of the wave front into at least one virtual observer window in an observer plane where an observer eye is located, and for imaging the Fourier transform of the formed wave front onto a screen.

2. Holographic projection device according to claim 1, wherein the mirror elements of the wave front modulator device are micro-mirrors.

3. Holographic projection device according to claim 1, wherein the mirror elements can be tilted or can be axially displaced in order to modulate the phase of the light.

4. Holographic projection device according to claim 1, wherein the mirror elements can be tilted in order to reconstruct the scenes in a predefined reconstruction volume.

5. Holographic projection device according to claim 1, wherein the optical system comprises a screen and at least one imaging means.

6. Holographic projection device according to claim 5, wherein a beam splitter element is disposed in front of the imaging means, seen in the direction of light propagation, for colour reconstruction of the scene, or in that the screen is a mirror, or a concave mirror.

7. Holographic projection device according to claim 1, wherein it comprises a one-dimensional wave front modulator device.

8. Holographic projection device according to claim 7, wherein it comprises for the generation of a two-dimensional wave front a deflection element which performs optical deflection at a right angle to the wave front modulator device.

9. Holographic projection device according to claim 8, wherein the deflection element is disposed between at least one light source and the wave front modulator device.

10. Holographic projection device according to claim 1, wherein it comprises a position detection system in order to detect an eye position of at least one observer in the observer plane.

11. Holographic projection device according to claim 10, wherein it comprises at least one deflection means for tracking at least one observer window in accordance with the eye position.

12. Holographic projection device according to claim 11, wherein for tracking the observer windows for multiple observers according to the respective eye positions of the observers, one deflection means per observer, one collimating lenticular common to all deflection means, and a common focusing element are disposed one after another, seen in the direction of light propagation.

13. Holographic projection device according to claim 11, wherein the deflection means is a mirror.

14. Holographic projection device according to claim 1, wherein it comprises lens elements in the optical path which aim at reducing aberrations.

15. Method for enlarging a reconstruction volume for viewing a reconstructed scene, where at least one light source emits sufficiently coherent light, comprising imaging the sufficiently coherent light on to a screen, where at least one mirror element of at least one wave front modulator device is moved by at least one actuator so to effect a phase shift in order to modulate the incident light, thus directly forming a wave front, according to the reconstructed scene, the wavefront originates from the light source, and is imaged by an optical system into at least one virtual observer window in an observer plane where an observer eye is located, and the Fourier transform of the formed wave front is imaged by the optical system onto the screen.

16. Method according to claim 15, wherein the mirror elements are tilted or are axially displaced in order to modulate the phase of the light.

17. Method according to claim 15, wherein the wave front of the sufficiently coherent light is directed locally as the mirror elements are tilted or in that the scene is reconstructed in the zeroth diffraction order as the mirror elements are tilted.

18. Method according to claim 15, wherein the optical system images the modulated wave front into the virtual observer window, where at least one imaging means of the optical system images the Fourier transform of the modulated wave front into its image-side focal plane on the screen.

19. Method according to claim 15, wherein a position detection system detects the eye position of at least one observer who views the reconstructed scene.

20. Method according to claim 19, wherein the virtual observer window is tracked according to the detected eye position of the observer.

21. Method according to claim 20, wherein at least one deflection means tracks the virtual observer window in the observer plane.

22. Method according to claim 15, wherein for two or more observers only one wave front modulator device is used for all left and one for all right eyes of the observers, and multiple light sources direct light to the mirror elements at different angles of incidence.

23. Method according to claim 15, wherein a deflection element generates a two-dimensional wave front from a one-dimensional wave front modulated by a one-dimensional wave front modulator device.

24. Method according to claim 15, wherein a colour reconstruction of the scene is performed simultaneously for the three primary colours with the help of a beam splitter element.

25. Method according to claim 24, wherein the simultaneous colour reconstruction of the scene is achieved with the help of three wave front modulator devices, where the beam splitter element recomposes the three individual wave fronts modulated by the three wave front modulator devices.

26. Method according to claim 15, wherein a colour reconstruction of the scene is performed sequentially for the three primary colours.

27. Method according to claim 26, wherein the sequential colour reconstruction of the scene is achieved with the help of at least one wave front modulator device.

28. Holographic projection device having a matrix of mirror elements, which comprises for an enlargement of a reconstruction volume for a reconstructed scene at least one wave front modulator device with an array of mirror elements, where the mirror elements have at least one actuator each, and where the mirror elements can be tilted in at least one direction and/or can be axially displaced with the help of the at least one actuator such to effect a phase shift, thereby directly forming a wave front for the representation of the reconstructed scene, and where the holographic projection device further comprises an optical system for imaging the wave front into at least one virtual observer window in an observer plane.

* * * * *